(12) United States Patent
Lange

(10) Patent No.: US 6,257,797 B1
(45) Date of Patent: Jul. 10, 2001

(54) TUBULAR MEMBER CONNECTOR

(76) Inventor: Fredric Lange, 13690 Elm Creek Rd., Osseo, MN (US) 55369-9343

(*) Notice: Subject to any disclaimer, the term of this patent is extended or adjusted under 35 U.S.C. 154(b) by 0 days.

(21) Appl. No.: 09/179,766

(22) Filed: Oct. 27, 1998

(51) Int. Cl.$^7$ .............................. F16B 7/00; F16B 12/36; F16B 13/00
(52) U.S. Cl. .............................. 403/297; 403/292
(58) Field of Search .................................. 403/297, 292, 403/298, 11, 12, 403, 205, 367, 368, 374.3; 285/394–396

(56) References Cited

U.S. PATENT DOCUMENTS

| | | | |
|---|---|---|---|
| 2,645,509 | 7/1953 | Valenta | 403/297 |
| 3,218,097 | * 11/1965 | Bowers et al. | 287/54 |
| 3,469,339 | 9/1969 | Thomas . | |
| 3,484,830 | 12/1969 | Wagner et al. | 285/397 |
| 3,574,367 | 4/1971 | Jankowski | 287/54 |
| 3,954,345 | 5/1976 | Morris | 403/297 |
| 3,977,800 | 8/1976 | Cassel | 403/170 |
| 4,637,193 | 1/1987 | Lange . | |
| 4,657,426 | 4/1987 | Targetti | 403/297 |
| 4,775,258 | 10/1988 | Lange . | |
| 4,859,109 | 8/1989 | Targetti | 403/297 |
| 4,958,953 | 9/1990 | Charondiere | 403/297 |
| 5,174,676 | * 12/1992 | Welsch et al. | 403/14 |
| 5,209,599 | 5/1993 | Kronenberg | 403/297 X |
| 5,454,661 | * 10/1995 | Litvin et al. | 403/298 |
| 5,642,957 | 7/1997 | Lange | 403/297 |
| 5,893,675 | * 4/1999 | Lange | 403/297 |

FOREIGN PATENT DOCUMENTS

| | | | |
|---|---|---|---|
| 371/31 | 1/1931 | (AU) | 403/297 |
| 449334 | 4/1968 | (CH) | 403/297 |
| 2059829 | 5/1972 | (DE) | 403/297 |
| 2103504 | 7/1972 | (DE) | 403/297 |
| 336915 | 10/1989 | (EP) | 403/297 |
| 723181 | 2/1955 | (GB) | 403/297 |
| 1052107 | 12/1966 | (GB) | 403/297 |
| 1097534 | 1/1968 | (GB) | 403/297 |

* cited by examiner

Primary Examiner—Lynne H. Browne
Assistant Examiner—John B. Walsh
(74) Attorney, Agent, or Firm—Alan Kamrath; Rider Bennett Egan & Arundel, LLP.

(57) ABSTRACT

A connector (10) for tubular members (12, 14) is disclosed including first and second connector elements (16, 18) each having U-shaped cross sections and jaw members (20, 22). A cam (60) is located between the connector elements (16, 18) which each preferably include a cam trough (52). The first and second connector elements (16, 18) are biased together by first and second O-rings (50) positioned around the connector elements (16, 18). The jaw members (20, 22) can be inserted in longitudinal insertion directions into the tubular members (12, 14) while the cam (60) is in an insertion position and the cam (60) can be rotated to a locked position to separate the jaw members (20, 22) sufficiently to grip the inside surfaces of the tubular members (12, 14) with sufficient force to prevent relative movement therebetween. A spring retainer (92) is held by a pin (100) extending through apertures (42) formed in the jaw members (20, 22) and apertures (98) formed adjacent the free edges of leg portions (94) of the spring retainer (92) which flex outwardly and grip the inside surface of the tubular member (12) when moved opposite to the insertion direction.

23 Claims, 2 Drawing Sheets

TUBULAR MEMBER CONNECTOR

BACKGROUND

The present invention generally relates to connectors, particularly to connectors for tubular members, and specifically to connectors for tubular members not requiring specific orientations of the tubular member, not requiring movement in directions other than parallel to the tubular member during installation and, in some preferred forms, not requiring modifications to the tubular member.

It is often desired to connect tubular members to various objects such as but not limited to connecting together the parallel tubes of first and second trusses to result in a single unitary truss having a span of their combined lengths. The almost universal mechanism for making such a connection is to bolt one truss to another. But in certain applications such as where it is desired to frequently connect and disconnect tubular members and/or where for aesthetic or other reasons bolts are not desired, other forms of connectors have been developed. As examples, U.S. Pat. Nos. 4,637,193 and 4,775,258 show connectors having male and female components attached by bolts to rods fastened inside of the tubular members. Thus, modification was required to the tubular members at least by fastening rods therein; due to its male/female nature, the tubular members could only be secured in corresponding orientations; and movement was required generally perpendicular to the tubular members to effect connection. Other forms of connection include connectors which slide with a friction fit in the ends of the tubular members such as shown in U.S. Pat. Nos. 3,469,339 and 5,209,599. However, such friction fit, slide connectors require close tolerances and were prone to allow separation when subjected to tensional forces parallel to the tubular members.

Another example of preferred connectors for tubular members is the type shown in U.S. Pat. No. 5,642,957 as well as U.S. Pat. Nos. 2,645,509; 3,484,830; 3,977,800; 4,657,426; and 4,859,109 and Australian Appln. No. 371/31. Each of these connectors connect tubular members by providing first and second jaw members insertable into the tubular member in a longitudinal insertion direction and separable after insertion a distance sufficient to allow the jaw members to grip the inside surface of the tubular member with sufficient force to prevent relative movement between the first and second jaw members and the tubular member, with the separation of the jaw members being operable from outside of the tubular member. However, such separable jaw member connectors were deficient such as by the number of components required, their manner of assembly, and the requirement of the use of a tool in operation.

Thus, a need continues to exist for other methods to connect tubular members and which overcome the shortcomings and disadvantages of prior connecting techniques.

SUMMARY

The present invention solves this need and other problems in the field of connecting tubular members by providing, in the preferred form, a cam located between and for camming first and second jaw members apart-to separate the first and second jaw members while inserted into the tubular member to grip the inside surface of the tubular member.

In other aspects of the present invention, a spring retainer is held in position relative to first and second jaw members and has first and second leg portions which flex relative to a central portion allowing the leg portions to cam upon the free end of the tubular member to flex the leg portions to be spaced for slideable receipt in the tubular member while the first and second jaw members are being inserted into the tubular member in a longitudinal insertion direction and allowing the leg portions to flex outwardly and grip the inside surface of the tubular member if the first and second jaw members are attempted to be moved opposite the longitudinal insertion direction.

It is thus an object of the present invention to provide a novel connector for tubular members.

It is further an object of the present invention to provide such a novel connector in some preferred forms which does not require any modification of the tubular member.

It is further an object of the present invention to provide such a novel connector which does not require particular orientations of the tubular member to allow interconnection.

It is further an object of the present invention to provide such a novel connector which does not require movement in directions other than parallel to the tubular member to effect connection.

It is further an object of the present invention to provide such a novel connector for connecting tubular members which are either longitudinally straight or arcuate.

It is further an object of the present invention to provide such a novel connector not requiring close tolerance manufacture.

It is further an object of the present invention to provide such a novel connector which securely grips the tubular member to prevent separation when subjected to tensional forces parallel to the tubular member.

It is further an object of the present invention to provide such a novel connector which maintains the tubular member in a desired rotational position without requiring connection between the tubular member and the connector.

It is further an object of the present invention to provide such a novel connector which distributes force under deflection to more securely grip the tubular member.

It is further an object of the present invention to provide such a novel connector of a simple design of few components that can be inexpensively manufactured and assembled.

It is further an object of the present invention to provide such a novel connector including a spring retainer for holding the connector in place in the tubular member while the connector is in an insertion position.

These and further objects and advantages of the invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "face", "outer", "inner", "upper", "lower", "height", "width", "length", "thickness", "end", "side", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiments.

DESCRIPTION

Connectors for interconnecting a tubular member to another member according to the preferred teachings of the present invention are shown in the drawings and generally designated 10. In most preferred embodiments of the present invention, connector 10 is an improvement of the type shown and described in U.S. Pat. No. 5,642,957 and application. Ser. No. 08/885,358. For purpose of explanation of the basic teachings of the present invention, the same numerals designate the same or similar parts in the present figures and the figures of U.S. Pat. No. 5,642,957 and application. Ser. No. 08/885,358. The description of the common numerals and connector 10 may be found herein and in U.S. Pat. No. 5,642,957 and application. Ser. No. 08/885,358 which are hereby incorporated herein by reference.

Referring to the drawings in detail, connector 10 interconnects a first tubular member 12 to and generally in line with a second tubular member 14. Tubular members 12 and 14 have annular cross sections and in the preferred form shown are of a circular shape in FIGS. 1–3 and are of a square shape in FIG. 7. Tubular members 12 and 14 are typically formed of extruded aluminum.

In the most preferred form, connector 10 includes a first connector element 16 and a second connector element 18 formed separately from connector element 16. Each connector element 16 and 18 includes first and second jaw members 20 and 22 integrally connected together and extending along a straight line. In the most preferred form, jaw members 20 and 22 terminate in free ends 21 and 23, respectively. In the most preferred form, elements 16 and 18 have generally U-shaped cross sections perpendicular to their longitudinal axes and include a flat central portion 24 having a length generally equal to or less than the width dimension of tubular members 12 and 14 and for slideable receipt within the inside surfaces of tubular members 12 and 14. First and second legs 26 upstand on opposite sides of central portion 24 generally perpendicular thereto and in the form shown extends outwardly from central portion 24 at an obtuse angle in the order of 105°. The free edges of legs 26 of jaw members 20 and 22 are cut to define teeth 28. In the most preferred form, elements 16 and 18 are formed of material having a hardness greater than tubular members 12 and 14 and in the most preferred form are formed of spring steel.

In the preferred form, the height of legs 26 above central portion 24 increases from free ends 21 and 23 to the connection between first and second jaw members 20 and 22. In the most preferred form, the minimum possible height of legs 26 at free ends 21 and 23 is generally equal to the thickness of flat central portion 24 and with the maximum possible height of legs 26 above central portion 24 at the connection between first and second jaw members 20 and 22 being generally equal to but slightly less than one-half of the height dimension of tubular members 12 and 14. In the most preferred form, the free edges of legs 26 of jaw members 20 and 22 have an arcuate shape from free ends 21 and 23 to the connection between first and second jaw members 20 and 22.

In the most preferred form, first and second, generally semicircular notches 46 are formed in flat central portion 24 and extend from free ends 21 and 23 adjacent to legs 26 and spaced from each other. Further, in the most preferred form, a cam trough 52 is formed in flat central portion 24 and the edges of legs 26 connected to flat central portion 24 in each connector element 16 and 18. Trough 52 is located at the connection between first and second jaw members 20 and 22 and extends generally perpendicular to legs 26 and perpendicular to the longitudinal axes of connector elements 16 and 18. In preferred forms, an aperture 31 is located at the connection between first and second jaw members 20 and 22 and in trough 52 and which extends generally perpendicular to central portion 24 and to the longitudinal axes of connector elements 16 and 18. In most preferred forms, an aperture 42 is located in central portion 24 of at least one and most preferably both jaw members 20 and 22 adjacent to but spaced from ends 21 and 23. In this regard, apertures 42 can be utilized to hold connector elements 16 and 18 during the finishing process, especially in forms where aperture 31 is omitted.

Connector 10 according to the teachings of the present invention generally includes provisions for changing the spacing between connector elements 16 and 18 to separate the pairs of jaw members 20 and 22, with such provisions being operable from outside of tubular members 12 and 14. According to the preferred teachings of the present invention, a cam 60 is positioned and rotatably movable between connector elements 16 and 18. In FIGS. 1–3, 5 and 6, cam 60 is shown by cam element 62 rotatable about an axis which is perpendicular to the longitudinal axes of connector elements 16 and 18, parallel to central portions 24 and within and parallel to cam troughs 52. In particular, cam element 62 includes a shaft portion 64 of a length greater than the width of central portion 24 and of circular cross sections. Shaft portion 64 includes first and second flat surfaces 66 which are parallel to each other and to a diameter of the circular cross sections and are spaced a distance which is considerably smaller than the diameter of the circular cross sections. Shaft portion 64 further includes third and fourth flat surfaces 68 which are parallel to each other and to a diameter of the circular cross sections and are spaced a distance generally equal to but slightly less than the diameter of the circular cross sections and which is greater than the spacing between surfaces 66. Surfaces 66 and 68 have an axial width generally equal to the widths of central portions 24 and for rotatable receipt within troughs 52.

Suitable provisions such as an integral handle 70 is provided to allow rotation of cam element 62. In the most preferred form, handle 70 extends generally perpendicular to shaft portion 64 thereby defining an L-shape. In the most preferred form, handle 70 extends generally perpendicular to flat surfaces 66. It should be appreciated that handle 70 allows rotation of cam 60 without the use of tools. However, other provisions can be utilized in the rotation of cam element 62.

According to the preferred teachings of the present invention, suitable provisions are provided to axially retain shaft portion 64 relative to troughs 52 with flat surfaces 66 and 68 being generally co-extensive with troughs 52. In a first preferred form shown in FIGS. 1–3 and 5, first and second axially spaced, circumferential grooves 72 are provided in shaft portion 64 on opposite sides of flat surfaces 66 and 68 and at a spacing generally equal to the spacing between the outside surfaces of legs 26 of connector elements 16 and 18. First and second C-ring retainers 72 are removably received in grooves 72 in a snap manner for abutment with the outside surfaces of legs 26 of connector elements 16 and 18. In another preferred form shown in FIG. 6, shaft portion 64 includes an integral retainer 76 located intermediate the ends of flat surfaces 66 and 68. In the preferred form shown, retainer 76 is generally spherical shaped of a diameter which is generally equal to the diameter of the circular cross sections of shaft portion 64 and greater than the diameter of apertures 31. Apertures 31 are of a size to partially receive retainer 76.

Suitable provisions are provided for retaining connector elements 16 and 18 as a single unit. In the preferred forms shown, connector 10 further includes provisions 50 for biasing connector elements 16 and 18 together which in the preferred form are first and second O-rings each having an inside diameter generally equal to and preferably slightly less than twice the length of connector element 16 or 18 between free ends 21 and 23. O-rings 50 have cross sections of a shape for receipt in notches 46 and of a dimension parallel to central portions 24 which is substantially less than one-half the spacing between legs 26. First and second O-rings 50 extend parallel to the longitudinal axes of jaw members 20 and 22 of connector elements 16 and 18 in a spaced, generally parallel manner over central portion 24 of first connector element 16, between jaw members 20 of first and second connector elements 14 and 16 (and in the form shown over free end 21 of first jaw member 20 of first connector element 16 and particularly in notches 46 thereof, between free ends 21 of first jaw members 20 of first and second connector elements 16 and 18, and over free end 21 of first jaw member 20 of second connector element 18 and particularly in notches 46 thereof), over central portion 24 of second connector element 18 parallel to the longitudinal axis of jaw members 20 and 22 of connector elements 16 and 18, and between jaw members 22 of first and second connector elements 14 and 16 (and in the form shown over free end 23 of second jaw member 22 of second connector element 18 and particularly in notches 46 thereof, between free ends 23 of second jaw members 22 of first and second connector elements 16 and 18, and over free end 23 of second jaw member 22 of first connector element 16 and particularly notches 46 thereof). The receipt of O-rings 50 in notches 46 maintains O-rings 50 in position adjacent to legs 26 and relative to connector elements 16 and 18 and specifically reduces the tendency for O-rings 50 to roll on central portions 24 of connector elements 16 and 18 in directions perpendicular to legs 26. Additionally, notches 46 space O-rings 50 inwardly from ends 21 and 23 to reduce their height above central portions 24 to be generally within the confines of legs 26. Additionally, due to the U-shaped cross sections, legs 26 prevent O-rings 50 from rolling past the sides of central portions 24 and off from connector elements 16 and 18. Extending O-rings 50 between jaw members 20 and 22 and especially when located in notches 46 tend to restrict relative movement of connector elements 16 and 18 in a single plane which is perpendicular to central portions 24 and parallel to legs 26.

Thus, O-rings 50 retain connector elements 16 and 18 together but allow relative movement therebetween. Specifically, due to their elastic nature, O-rings 50 act as rubber bands or similar elastic members which tend to draw connector elements 16 and 18 together sandwiching cam 60 between connector elements 16 and 18. Thus, the spacing between connector elements 16 and 18 when drawn together by O-rings 50 is dependent on the positioning of cam 60 and is adjustable according to the rotatable positioning of cam 60. Further, it should be appreciated that cam element 62 is prevented from being withdrawn from between connector elements 16 and 18 drawn together by O-rings 50 by the abutment of retainers 74 with the outside surfaces of legs 26 of connector elements 16 and 18 in the form of FIGS. 1–3 and 5 or by the receipt of retainer 76 within apertures 31 of connector elements 16 and 18 in the form of FIG. 6.

Figures 1, 2, 3, 4, 5:
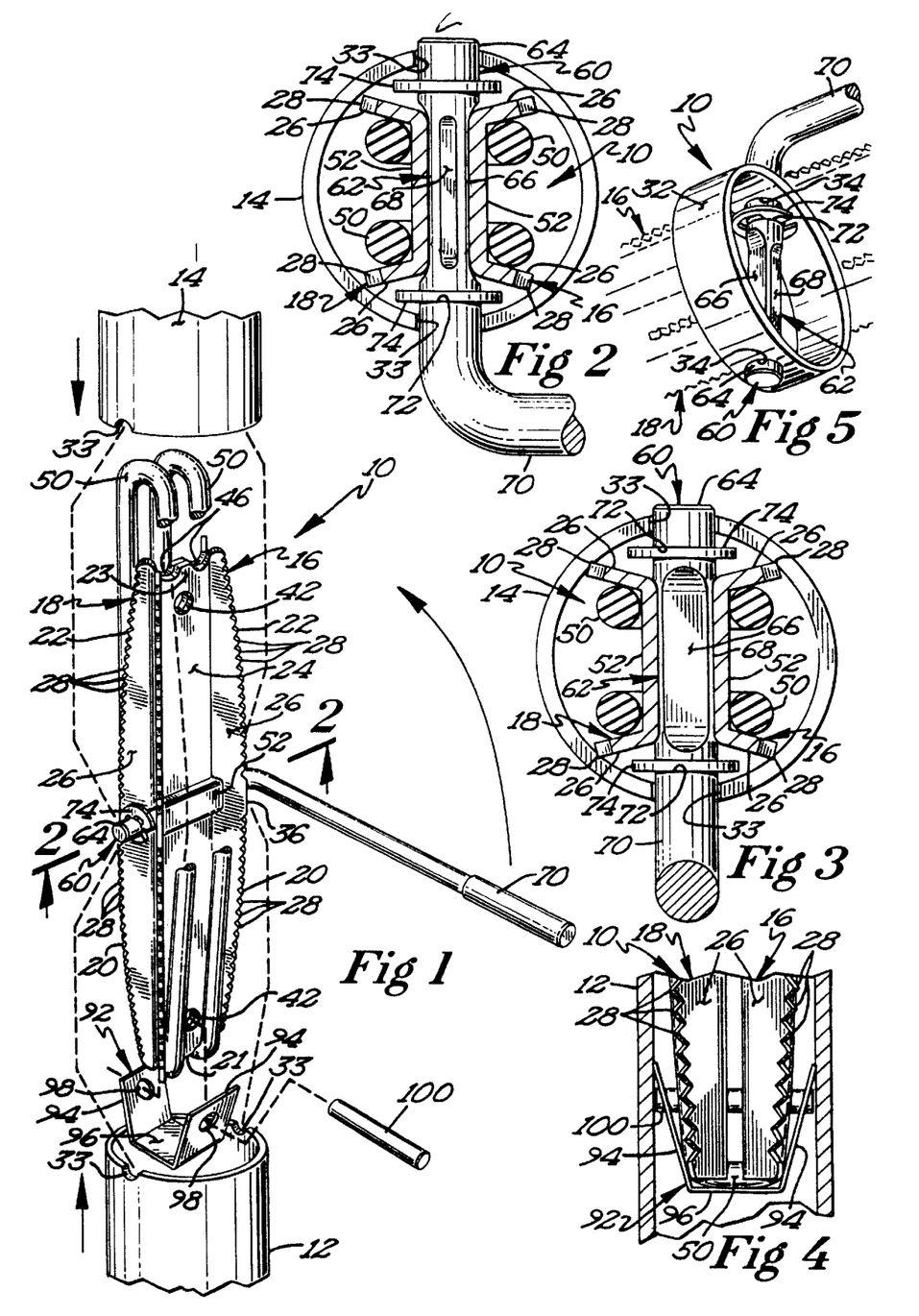
FIG. 1 shows an exploded perspective view of a connector for interconnecting first and second tubular members in a co-extensive and linear manner according to the preferred teachings of the present invention, with portion broken away.
FIG. 2 shows a cross sectional view of the connector of FIG. 1 in its insertion position according to section line 2—2 of FIG. 1.
FIG. 3 shows a cross sectional view of the connector of FIG. 1 in its locked position.
FIG. 4 shows a partial, cross sectional view of the connector of FIG. 1.
FIG. 5 shows a perspective view of an alternate form of a connector for interconnecting first and second tubular members in a co-extensive and linear manner according to the preferred teachings of the present invention, with portions shown in phantom.

In a preferred form such as shown in FIG. 5, connector 10 according to the preferred teachings of the present invention further includes a collar 32 having annular cross sections with an outer periphery of a shape corresponding to that of the outer periphery of tubular members 12 and 14 and in the most preferred form and especially for tubular members 12 and 14 having annular cross sections, the cross sections of collar 32 are the same size and shape as the cross sections of tubular members 12 and 14. Collar 32 includes first and second apertures 34 diametrically opposite to each other and of a size allowing passage and rotation of shaft portion 64. In the most preferred form, the free edges of legs 26 intermediate jaw members 20 and 22 and coincident with cam troughs 52 include a portion 36 located below teeth 28 and having a shape which can abut with the inside surfaces of the upper and lower portions of collar 32 and specifically which is flat in the most preferred form.

In other preferred forms such as shown in FIGS. 1–3 and 6, collar 32 is omitted from connector 10 according to the teachings of the present invention. First and second semi-circular recesses 33 can be formed on the diametric opposite sides of the free end of tubular members 12 and 14. Recesses 33 have diameters generally equal to and for receipt of shaft portion 64. Thus, tubular members 12 and 14 can be inserted on connector 10 until their free ends abut to present an aesthetically continuous appearance.

Jaw members 20 and 22 of each connector element 16 and 18 in the most preferred form shown are symmetrical. Furthermore, connector elements 16 and 18 in the most preferred form are of identical construction to reduce fabrication costs. Furthermore, it can be appreciated that the same connector elements 16 and 18 can be received in tubular members 12 and 14 having square annular cross sections and circular annular cross sections as well as other annular cross sectional shapes. In this regard, the obtuse angle of legs 26 relative to flat central portion 24 is advantageous in the ability to engage either arcuate or flat inner surfaces. Additionally, in the most preferred form, aperture 31 is threaded for receipt of a set screw so that the same connector elements 16 and 18 can be utilized with the spacing changing provisions of the type disclosed and shown in U.S. Pat. No. 5,642,957 and application Ser. No. 08/885,358 as well as cam 60 shown in the preferred forms of the present invention. Thus, in addition to reduced fabrication costs, inventory requirements are also reduced.

Now that the basic construction of connector 10 including cam element 62 according to the preferred teachings of the present invention has been set forth, the assembly and use of connector 10 including cam element 62 can be explained and appreciated. Specifically, connector elements 16 and 18 are positioned with central portions 24 in a parallel relation with legs 26 of connector elements 16 and 18 extending in opposite directions. O-rings 50 can be stretched over and positioned on connector elements 16 and 18. At that time, if desired, collar 32 can be slid over one end of connector elements 16 and 18 such as jaw members 22 and into position such portion 36 of connector element 16 is positioned to abut with the inside surface of the lower portion of collar 32, and portion 36 of connector element 18 is positioned to abut with the inside surface of the upper portion of collar 32 with the axis of apertures 34 located generally parallel to the planes of central portions 24 and extending through cam troughs 52 between connector elements 16 and 18. The free end of shaft portion 64 can be inserted through one of apertures 34 of collar 32 and into cam troughs 52. For ease of insertion, connector elements 16 and 18 can be physically separated against the bias of O-rings 50 and held in a separated condition by any suitable manner not shown. After passing through cam troughs 52, the free end of shaft portion 64 can be inserted through the other of apertures 34 of collar 32. In the event that grooves 72 are provided in shaft portion 64, C-ring retainers 74 can be snapped therein for axially retaining shaft portion 64 in cam troughs 52. In forms where collar 32 is not utilized, connector 10 can be similarly assembled or can be assembled in other manners including but not limited to positioning shaft portion 64 between connector elements 16 and 18 before stretching and positioning O-rings 50 on connector elements 16 and 18. It can then be appreciated that connector 10 according to the preferred teachings of the present invention is held together as a single unit and no loose parts or further assembly is required. It can also be appreciated that the axis of cam element 62 is defined by shaft portion 64 and extends perpendicular to the insertion direction and to the separation direction.

Figure 6:
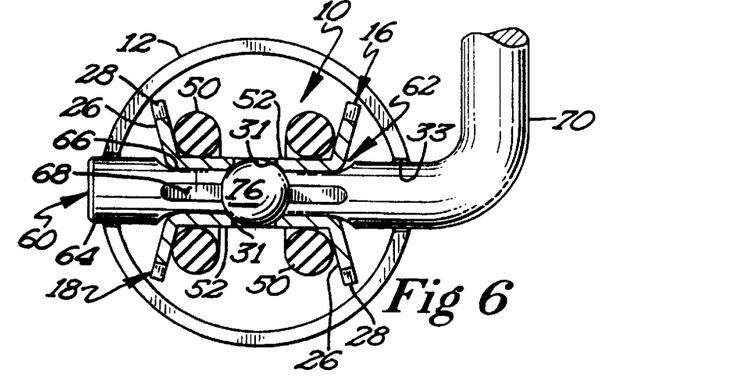
FIG. 6 shows a cross sectional view of a further alternate form of a connector for interconnecting first and second tubular members in a co-extensive and linear manner according to the preferred teachings of the present invention, with the connector shown in its insertion position.

When it is desired to utilize connector 10 to interconnect to tubular member 12, cam element 62 should be rotated to an insertion position such that flat surfaces 66 are generally parallel to central portions 24 as shown in FIGS. 2 and 6, which in the preferred form is when handle 70 extends generally perpendicular to the longitudinal axes of connector elements 16 and 18. In this insertion position, O-rings 50 bias connector elements 16 and 18 together to their minimum spacing such that legs 26 of jaw members 20 can be inserted and slid in a longitudinal insertion direction parallel to the longitudinal axes of jaw members 20 and 22 of connector elements 16 and 18 between the inside surfaces of the upper and lower portions of tubular member 12 for an insertion distance. Specifically, when collar 32 is utilized, jaw members 20 are inserted until the free end of tubular member 12 abuts with collar 32. When connector 10 does not include collar 32, jaw members 20 of connector elements 16 and 18 are inserted until shaft portion 64 abuts with the free end of tubular member 12. When tubular member 12 has circular cross sections, connector 10 according to the preferred teachings of the present invention can be rotated in tubular member 12 until shaft portion 64 aligns with or can be received in recesses 33. It can be appreciated that the generally U-shaped cross sections of jaw members 20 and 22 are perpendicular to the longitudinal insertion direction.

At that time and while jaw members 20 are inserted into tubular member 12, cam element 62 can be rotated to a locked position such that flat surfaces 68 are generally parallel to central portions 24, which in the preferred form is when handle 70 extends generally parallel to the longitudinal axes of elements 16 and 18 and of tubular member 12. It can then be appreciated that due to the increased spacing of flat surfaces 68 from that of surfaces 66, the rotation of cam element 62 forces central portions 24 of connector elements 16 and 18 to separate against the bias of O-rings 50 and holds central portions 24 apart. As the central portions 24 separate, the distance between teeth 28 of jaw members 20 increase in an amount sufficient to allow teeth 28 to engage and grip the inside surfaces of tubular member 12 in a non-slip manner and specifically with sufficient force to prevent relative movement between jaw members 20 and tubular member 12. It should be noted that due to the greater hardness of connector elements 16 and 18 than tubular members 12 and 14, teeth 28 will tend to dig into the inside surfaces of tubular member 12 to enhance the non-slip engagement of connector 10 and tubular member 12. It should further be appreciated that since surfaces 68 are machined to be flat in the most preferred form rather than being arcuate, corners are defined between surfaces 66 and 68 which would reduce the possibility of cam element 62 unintentionally rotating from the locked position to the insertion position as the result of external forces.

In the most preferred form where connector 10 interconnects tubular members 12 and 14, after tubular member 12 has been slid over jaw members 20 and prior to rotating cam element 62 from its insertion position to its locked position, tubular member 14 can be similarly slid in a longitudinal insertion direction over jaw members 22 for an insertion distance. Specifically, when collar 32 is utilized, jaw members 22 are inserted until the free end of tubular member 14 abuts with collar 32 on the opposite side than tubular member 12. When connector 10 does not include collar 32, jaw members 22 of connector elements 16 and 18 are inserted until shaft portion 64 abuts with the free end of tubular member 14. When tubular member 14 has circular cross sections, connector 10 according to the preferred teachings of the present invention can be rotated in tubular member 14 until shaft portion 64 aligns with or can be received in recesses 33.

It can be appreciated that when cam element 62 is rotated from its insertion position to its locked position, connector elements 16 and 18 move apart in a separation direction so that the distance between teeth 28 of jaw members 22 also increases in an amount sufficient to allow teeth 28 of jaw members 22 to engage and grip the inside surfaces of tubular member 14 in a non-slip manner and specifically with sufficient force to prevent relative movement between jaw members 20 and 22 and tubular members 12 and 14 and thus also between tubular members 12 and 14. Thus, connector 10 of the preferred form interconnects tubular members 12 and 14 together in an aligned, generally contiguous manner.

When it is desired to remove the interconnection of tubular members 14 and/or 12 from connector 10 according to the preferred teachings of the present invention, cam element 62 can be rotated from its locked position to its insertion position. Thus, central portions 24 of connector elements 16 and 18 are not forced and held apart by flat surfaces 68 such that O-rings 50 draw connector elements 16 and 18 together and teeth 28 of jaw members 20 and 22 do not engage the inside surfaces of tubular members 12 and 14 with sufficient force to prevent relative movement. Thus, tubular members 14 and/or 12 can be slid longitudinally opposite to the insertion direction and from jaw members 22 and 20, respectively, to remove tubular members 14 and/or 12 from connector 10.

Figure 7:
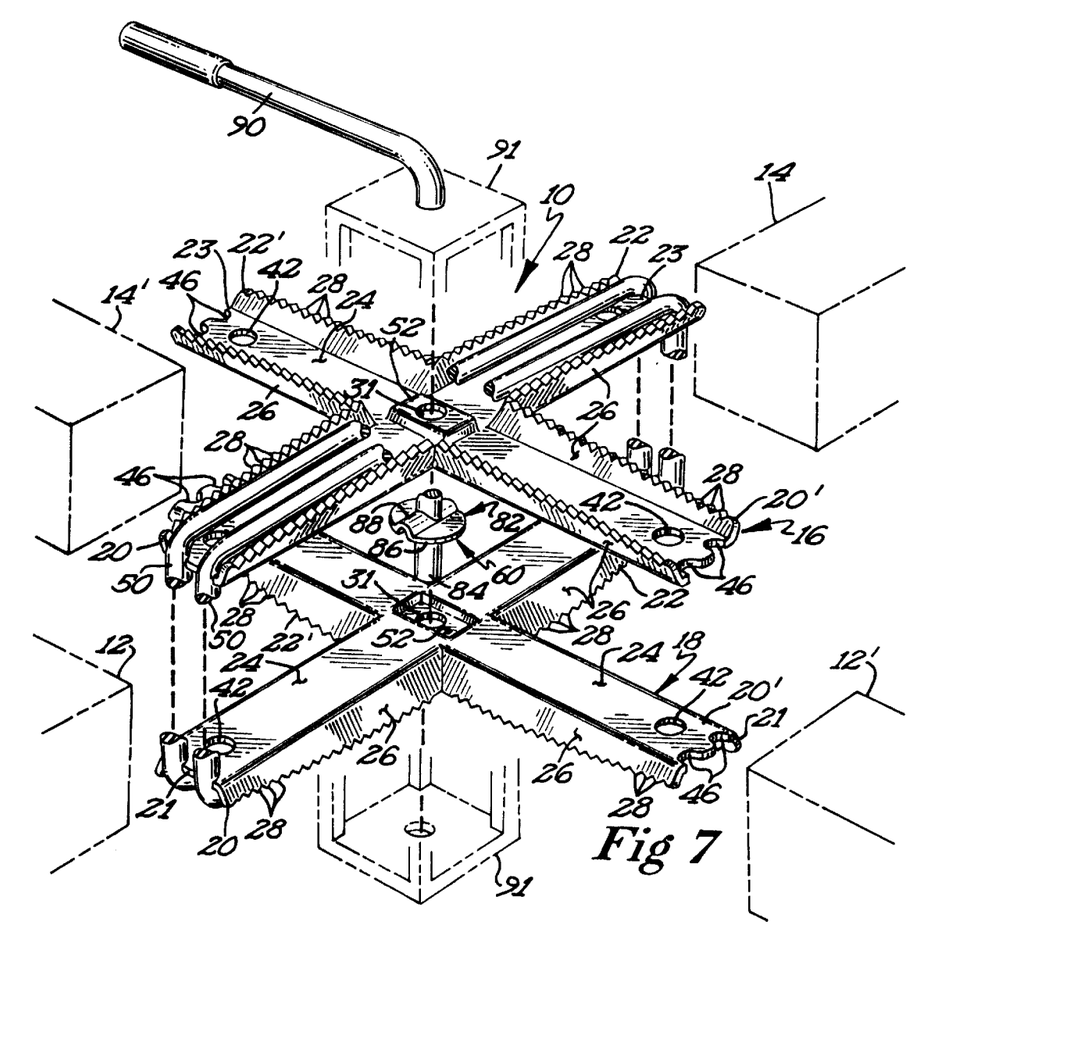
FIG. 7 shows an exploded perspective view of still a further alternate form of a connector for interconnecting tubular members according to the preferred teachings of the present invention, with portions broken away and shown in phantom.

In the preferred form shown in FIG. 7, cam 60 is shown by a cam element 82 rotatable about an axis which is perpendicular to the longitudinal axes of connector elements 16 and 18 and cam troughs 52 and perpendicular to central portions 24. In particular, cam element 82 includes a shaft portion 84 of a length greater than twice the maximum height of legs 26 above central portion 24. Shaft portion 84 has circular cross sections of a size for rotatable receipt in apertures 31. A circular disc 86 extends radially from shaft portion 84 and is of a diameter greater than shaft portion 84 and generally equal to the width of central portions 24 of connector elements 16 and 18. Disc 86 includes at least a first diametric projection 88 of a size for receipt in cam trough 52 in a respective connector element 16 or 18. It can be appreciated that if only a single diametric projection 88 is provided to allow formation by stamping, cam trough 52 of the respective connector element 16 or 18 can be omitted (if identical construction of connector elements 16 and 18 is not desired) or two diametric projections 88 can be provided extending axially on opposite sides of disc 86 if troughs 52 are provided in both connector elements 16 and 18. It should also be appreciated that cam element 82 could be formed by other manners such as but not limited to by a pin extending perpendicular to shaft portion 84.

In the form shown, the spacing between first and second O-rings 50 extending over central portions 24 of connector elements 16 and 18 is generally equal to or slightly greater than the diameter of shaft portion 84, with shaft portion 84 located intermediate O-rings 50. Further, notches 46 insure that O-rings 50 do not engage with shaft portion 84 in a manner resulting in wear which significantly reduces the expected life of O-rings 50.

Suitable provisions such as an integral handle 90 is provided to allow rotation of cam element 82. In the most preferred form, handle 90 extends generally perpendicular to shaft portion 84 thereby defining an L-shape. In the most preferred form, handle 90 extends parallel to disc 86 and projection 88.

Now that the basic construction of connector 10 including cam element 82 according to the preferred teachings of the present invention has been set forth, the assembly and use of connector 10 including cam element 82 can be explained and appreciated. Specifically, the free end of handle 90 can be inserted through aperture 31 of connector element 16, and connector element 16 can be slid on handle 90 and shaft portion 84 until it is positioned to abut with disc 86. The free end of shaft portion 84 can be inserted through aperture 31 of connector element 18, and connector element 18 can be slid on shaft portion 84 until it is positioned to abut with disc 86 opposite to connector element 16. O-rings 50 can be stretched over and positioned on connector elements 16 and 18. Thus, O-rings 50 draw and retain connector elements 16 and 18 together, with the spacing between connector elements 16 and 18 when drawn together by O-rings 50 being dependent on the positioning of cam element 82 and is adjustable according to the rotatable positioning of cam element 82. It can then be appreciated that connector 10 according to the preferred teachings of the present invention is held together as a single unit and no loose parts or further assembly is required. It should also be appreciated that shaft portion 84 extending through apertures 31 of connector elements 16 and 18 also acts as a pilot in the reciprocation of connector elements 16 and 18 in the separation direction generally perpendicular to the insertion direction and to central portions 24 and in particular generally prevents movement of connector elements 16 and 18 parallel to central portions 24 and perpendicular to the separation direction. It should also be appreciated that the axis of cam element 82 is defined by shaft portion 84 which extends perpendicular to the insertion direction and parallel to the separation direction.

When it is desired to utilize connector 10 to interconnect to tubular member 12, cam element 82 is rotated to an insertion position such that projection 88 is located within cam trough 52 of connector element 16, which in the preferred form is when handle 90 extends generally perpendicular to the longitudinal axes of jaw members 20 and 22 of connector elements 16 and 18. In this insertion position, O-rings 50 bias connector elements 16 and 18 together to their minimum spacing such that legs 26 of jaw members 20 can be inserted and slid in a longitudinal insertion direction parallel to the longitudinal axes of jaw members 20 and 22 of connector elements 16 and 18 between the inside surfaces of the upper and lower portions of tubular member 12 for an insertion distance.

At that time and while jaw members 20 are inserted into tubular member 12, cam element 82 can be rotated to a locked position such that projection 88 is located outside of cam trough 52 and abuts with central portions 24 of jaw members 20 and 22, which in the preferred form is when handle 70 extends generally parallel to the longitudinal axes of jaw members 20 and 22 and of tubular member 12. projection 88 abutting with central portions 24 of connector element 16 separates central portions 24 of connector elements 16 and 18 against the bias of O-rings 50 and holds central portions 24 apart. As the central portions 24 separate, the distance between teeth 28 of jaw members 20 increase in an amount sufficient to allow teeth 28 to engage and grip the inside surfaces of tubular member 12 in a non-slip manner and specifically with sufficient force to prevent relative movement between jaw members 20 and tubular member 12. It should be noted that due to the greater hardness of connector elements 16 and 18 than tubular members 12 and 14; teeth 28 will tend to dig into the inside surfaces of tubular member 12 to enhance the non-slip engagement of connector 10 and tubular member 12.

In the most preferred form where connector 10 interconnects tubular members 12 and 14, after tubular member 12 has been slid over jaw members 20 and prior to rotating cam element 82 from its insertion position to its locked position, tubular member 14 can be similarly slid in a longitudinal insertion direction over jaw members 22 for an insertion distance. It can then be appreciated that when cam element 82 is rotated from its insertion position to its locked position, connector elements 16 and 18 move apart in a separation direction so that the distance between teeth 28 of jaw members 22 also increases in an amount sufficient to allow teeth 28 of jaw members 22 to engage and grip the inside surfaces of tubular member 14 in a non-slip manner and specifically with sufficient force to prevent relative movement between jaw members 20 and 22 and tubular members 12 and 14 and thus also between tubular members 12 and 14. Thus, connector 10 of the preferred form interconnects tubular members 12 and 14 together in an aligned, generally contiguous manner.

When it is desired to remove the interconnection of tubular members 14 and/or 12 from connector 10 according to the preferred teachings of the present invention, cam element 82 can be rotated from its locked position to its insertion position. Thus, central portions 24 of connector elements 16 and 18 are not forced and held apart by projection 88 such that O-rings 50 draw connector elements 16 and 18 together and teeth 28 of jaw members 20 and 22 do not engage the inside surfaces of tubular members 12 and 14 with sufficient force to prevent relative movement. Thus, tubular members 14 and/or 12 can be slid longitudinally opposite to the insertion direction and from jaw members 22 and 20, respectively, to remove tubular members 14 and/or 12 from connector 10.

Although connector 10 of the preferred forms described thus far interconnects tubular member 12 generally coextensive and in alignment with tubular member 14, connector 10 according to the teachings of the present invention can provide other forms of interconnection. For example, jaw members 20 and 22 could be arranged at a non-linear angle. Although it would then be unable to fabricate connector elements 16 and 18 from an identical metal stamping, it may be desired in certain applications to interconnect tubular members 12 and 14 at non-linear angles. Further, connector 10 can be arranged to interconnect tubular member 12 to more than one further tubular member 14 or to other types of members such as horizontal or vertical support panels. For example, connector elements 16 and 18 could have jaw members 20 and 22 arranged in a Y, X, or other shape according to the teachings of the present invention.

In this regard, connector 10 utilizing cam element 82 according to the teachings of the present invention is especially advantageous interconnecting more than two tubular members 12 and 14 and/or interconnecting without alignment therebetween. In particular, FIG. 7 shows each connector element 16 and 18 including third and fourth jaw members 20' and 22' integrally connected together and with first and second jaw members 20 and 22, with jaw members 20' and 22' extending along a straight line generally perpendicular to the longitudinal axes of first and second jaw members 20 and 22. O-rings 50 can also be provided to extend between jaw members 20' and 22' in a similar manner as extending between jaw members 20 and 22.

In the most preferred form where connector 10 interconnects tubular members 12, 12', 14 and 14', after tubular members 12 and 14 have been slid over jaw members 20 and 22 and prior to rotating cam element 82 from its insertion position to its locked position, tubular members 12' and 14' can be similarly slid in longitudinal insertion directions over jaw members 20' and 22', respectively, for an insertion distance. It can be appreciated that when cam element 82 is rotated from its insertion position to its locked position, the distance between teeth 28 of jaw members 20' and 22' also increases in an amount sufficient to allow teeth 28 of jaw members 20' and 22' to engage and grip the inside surfaces of tubular members 12' and 14' in a non-slip manner and specifically with sufficient force to prevent relative movement between jaw members 20' and 22' and tubular members 12' and 14' and thus also between tubular members 12, 12', 14 and 14'. Thus, connector 10 of the preferred form interconnects tubular members 12, 12', 14 and 14' together, with tubular members 12 and 14 and tubular members 12' and 14' being in an aligned, generally contiguous manner in the most preferred form.

When it is desired to remove the interconnection of tubular members 14' 14, 12' and/or 12 from connector 10 according to the preferred teachings of the present invention, cam element 82 can be rotated from its locked position to its insertion position. Thus, central portions 24 of connector elements 16 and 18 are not forced and held apart by projection 88 such that O-rings 50 draw connector elements 16 and 18 together and teeth 28 of jaw members 20, 20', 22 and 22' do not engage the inside surfaces of tubular members 12, 12', 14 and 14' with sufficient force to prevent relative movement. Thus, tubular members 14', 14, 12' and/or 12 can be slid longitudinally opposite to the insertion direction and from jaw members 22', 22, 20' and 20, respectively, to remove tubular members 14', 14, 12' and/or 12 from connector 10.

It should be appreciated that the insertion distance can be until the free ends of tubular members 12 and 14 abut together (and assuming that recesses 33 are provided on the free ends for slideable receipt of shaft portion 84) when connector 10 is of the type for interconnecting only first and second tubular members 12 and 14. It should also be appreciated that when connector 10 is utilized to interconnect three or more tubular members 12, 12', 14 and 14', the use of a collar 91 may be advantageous for at least aesthetic reasons without requiring major modifications to the free ends of tubular members 12, 12', 14, and 14'. In this regard, fabrication of collar 91 would require at least partial fabrication after assembly of connector elements 16 and 18, O-rings 50, and cam 60 according to the preferred teachings of the present invention. Additionally, the shape of collar 91 would be dictated by the shape of connector elements 16 and 18 and preferably such that the free ends of each tubular member 12, 12', 14 and 14' interconnected by connector 10 would flushly abut with collar 91 when inserted the insertion distance.

According to a preferred embodiment of the present invention, connector 10 further includes a generally U-shaped spring retainer 92. In particular, spring retainer 92 is formed by bending a rectangular strip of spring material to include first and second leg portions 94 upstanding from the opposite edges of a central portion 96 at an obtuse angle. The width of spring retainer 92 is generally equal to the width of jaw members 20 and 22 and less than the diameter of tubular members 12 and 14. The lower edges of leg portions 94 connected to central portion 96 are spaced less than the diameter of tubular members 12 and 14 but greater than the height of connector 10 adjacent ends 21 and 23 of connector elements 16 and 18 while the upper free edges of leg portion 94 in an unflexed condition are spaced greater than the diameter of tubular members 12 and 14. An aperture 98 is formed in each leg portion 94 adjacent to its free edge and spaced from central portion 96 so that a pin 100 can be inserted through aperture 98 of first leg portion 94, through apertures 42 of jaw members 20, and through aperture 98 of second leg portion 94, with central portion 96 extending over free ends 21 of jaw members 20. It should be appreciated that the increasing height of legs 26 from free ends 21 and 23 to the connection between jaw members 20 and 22 is advantageous in allowing the positioning of spring retainer 92 on free ends 21 or 23 of jaw members 20 or 22 and still allow insertion in the free ends of tubular member 12 and 14.

It can be appreciated that there are occasions-when it is desirable for connector 10 to be held in one of tubular members 12 and 14 even when cam 60 is in its insertion position. As an example, there is less chance of loss of connector 10 if it is held with tubular member 12 or 14 which is of a much greater size. According to the preferred teachings of the present invention, pin 100 is inserted through apertures 42 and 98 with spring retainer 92 extending over free ends 21 of the desired jaw members 20. At that time, jaw members 20 are inserted into tubular member 12 in a similar manner as if spring retainer 92 was not present. It can be appreciated that leg portions 94 will cam upon the free end of tubular member 12 to decrease the obtuse angle with central portion 96 and such that the upper free edges of leg portion 94 will be spaced equal to and for slideable receipt in tubular member 12. Thus, jaw members 20 can be inserted in tubular member 12 for the insertion distance. Similarly, cam 60 can be moved from its insertion position to its locked position to interconnect tubes 12 and 14 and moved from its locked position to its insertion position when interconnection between tubes 12 and 14 is not desired in the normal fashion. It can then be appreciated that tube 14 can be removed from jaw members 22 by movement opposite to the longitudinal insertion direction. However, if tubular member 12 is attempted to be removed from jaw members 20 by movement opposite to the longitudinal insertion direction, jaw members 20 will attempt to move spring retainer 92 out of tubular member 12 due to pin 100 extending through apertures 42 and 98. However, movement of spring retainer 92 opposite to the longitudinal insertion direction causes leg portions 94 to flex outwardly and grip the inside surface of tubular member 12. Sharp corners on the upper free edges of leg portions 94 enhance the gripping engagement with the inside surface of tubular member 12. Additionally, the greater the force that is applied to attempt to pull jaw members 20 from tubular member 12, the greater the-force that the upper free edges of leg portions 94 grip the inside surface of tubular member 12. Thus, jaw members 20 and connector 10 are thereby held in tubular member 12 as a single unit resulting in less chance of loss. Nondestructive removal of connector 10 according to the teachings of the present invention can be accomplished by inserting a tool through the free end of tubular member 12 which flexs leg portions 94 inwardly away from the inside surface of tubular member 12 to allow removal.

It should be appreciated that connector 10 according to the preferred teachings of the present invention is advantageous for several reasons. First, interconnection and disconnection occurs by movement only in the longitudinal insertion direction and specifically there is no requirement that tubular members 12 and 14 and/or connector 10 be moved in a lateral direction and in a nonparallel direction to the longitudinal insertion direction. Furthermore, as tubular members 12 and 14 always provide the female component of the interconnection, no particular orientation of tubular members 12 and 14 is required as either end of tubular members 12 and 14 can be utilized for interconnection. Additionally, tubular members 12 and 14 can be formed by standard techniques such as extrusion with normal tolerances and the components of connector 10 need not be formed with close tolerance manufacture such as would be required in sliding friction fit type connections. Additionally, modifications to tubular members 12 and 14 such as providing a threaded end, welding or similar attachment of components thereto, and the like are not required when collar 32 is utilized and are minimal in the formation of recesses 33 when collar 32 is not utilized. It should further be appreciated that O-rings 50 are readily available, commercially standard parts, that collar 32 is formed by cutting an extruded tube, that cam element 62 and integral handle 70 is formed by cutting and/or machining and bending round stock, and that connector elements 16 and 18 are fabricated from an identical metal stamping. Thus, connector 10 according to the preferred teachings of the present invention is of a simple design of few components that can be inexpensively manufactured and assembled. Furthermore, connector 10 interconnects and securely grips tubular members 12 and 14 to prevent separation when subjected to forces from any direction including but not limited to tensional forces parallel to tubular members 12 and 14.

In addition to being advantageous in its ability to be received in tubular members 12 and 14 of different shaped, annular cross sections, the preferred shape of connector elements 16 and 18 and in the most preferred form of legs 26 thereof allows connector 10 to be utilized in tubular members 12 and 14 which are linearly straight along their longitudinal lengths but also which are arcuate along their longitudinal lengths. Specifically, due to the arcuate shape of the free edges of legs 26 and the increasing height of jaw members 20 and 22 from their free ends 21 and 23 to the center of connector 10, the spacing between teeth 28 or in other words between the free edges of legs 26 of jaw members 20 and 22 of connector elements 16 and 18 of connector 10 increases from free ends 21 and 23 for the distance that jaw members 20 and 22 are inserted into tubular members 12 and 14. Thus, connector 10 is able to be inserted in the ends of arcuate shaped tubular members 12 and 14. The insertion direction of connector 10 may be parallel to the longitudinal shape of the tubular member 12 and 14 and not necessarily along a straight line. It should be appreciated that in the preferred form, teeth 28 on portions of the free edges of legs 26 may not engage tubular members 12 and 14 or may engage with unequal force as teeth 28 at other portions of the free edges of legs 26. Similarly, teeth 28 of jaw members 20 and 22 may not engage tubular members 12 and 14, respectively, in the same manner and/or jaw members 20 or 22 may not engage tubular members 12 or 14 in the same manner for connector elements 16 and 18. However, it should be appreciated that a sufficient amount of teeth 28 should engage the inside surfaces of tubular members 12 and 14 with sufficient force to interconnect and securely grip tubular members 12 and 14. This feature of being able to interconnect nonlinear tubular members 12 and 14 is especially important as it allows tubular members 12 and 14 to be removably connected in the shape of circles and arcs such as for the construction of trade show booths, store displays, and the like.

It should be appreciated that the opposite, outwardly facing U-shaped, jaw members 20 and 22, especially with teeth 28 formed on the free edges of legs 26, are advantageous in maintaining tubular members 12 and 14 in a desired rotational position without requiring connection such as by pins between tubular members 12 and 14 and connector 10. Specifically, loads placed upon tubular members 12 and 14 can place forces which tend to rotate tubular members 12 and 14 about their longitudinal axes and result in one or both tubular members 12 and 14 having a tendency to twist relative to connector 10 especially when one or both of tubular members 12 and 14 have circular cross sections. The abutment of the free edges of legs 26, and in the preferred form teeth 28 thereof, securely grip the inside surfaces of tubular members 12 and 14 to maintain tubular members 12 and 14 in the desired rotational position. Additionally, the capture of shaft portion 64 within recesses 33 also aids in preventing relative rotation of jaw members 20 and 22 inside of tubular members 12 and 14 and of tubular members 12 and 14 relative to each other.

Also with legs 26 extending outwardly at an obtuse angle to central portions 24, legs 26 are angled so that the free edges of legs 26 engage the corners of tubular members 12 and 14 having cross sections of a right parallelepiped shape. This would be especially important for gripping the inside surfaces of tubular members 12 and 14 when subjected to deflection forces parallel to central portions 24. Also, this would be advantageous for gripping the inside surfaces of tubular members 12 and 14 having circular cross sections.

It should be noted that connector 10 according to the teachings of the present invention is also advantageous in equalizing pressures between tubular members 12 and 14 when placed under load. In particular, cam 60 acts as a fulcrum allowing connector elements 16 and 18 to tip so that the engagement forces on tubular members 12 and 14 by jaw members 20 and 22 are equalized. This feature is especially important when connector 10 according to the teachings of the present invention connects arcuate tubular members 12 and 14.

Now that the basic teachings of the present invention have been explained, many extensions and variations will be obvious to one skilled in the art. For example, the shapes of the annular cross sections of tubular members 12 and 14 and/or of jaw members 20 and 22 and other components of connector 10 can take other forms according to the teachings of the present invention.

Similarly, the preferred forms shown utilize connector 10 to connect tubular members 12 and 14 of an elongated length. However, connector 10 according to the teachings of the present invention could also be utilized to connect tubular member 12 of an elongated length to tubular member 14 of a reduced length even less than the length of jaw members 22. As an example, connector 10 could be utilized to connect tubular member 12 to a wall, node, or similar structure.

Further, although connector 10 in the preferred form shown includes separate, first and second connector elements 16 and 18 each having first and second jaw members 20 and 22 which is especially advantageous for connecting first and second tubular members 12 and 14, connector 10 can include other configurations according to the teachings of the present invention. As an example, connector elements 16 and 18 could each include first jaw members 20 for connecting to tubular member 12 and could include jaws or other provisions for connecting tubular member 12 to other members which may be tubular and/or which may not be of an elongated thickness.

Furthermore, although each collar 32 or 91 has an outer periphery corresponding to those of tubular members 12 and 14 in the form shown and is believed to be advantageous as not extending beyond the outer peripheries of tubular members 12 and 14, collar 32 or 91 could have other shapes and sizes according to the teachings of the present invention such as for becoming a decorative element. Likewise, collar 32 or 91 could provide a transitional function between dissimilar sized or shaped tubular members 12 and 14. In this regard, the fulcrum function of cam 60 in the forms shown would be especially important in equalizing pressure between tubular members 12 and 14 of dissimilar sizes or shapes. Furthermore, cam 60 according to the teachings of the present invention could be shaped so that jaw members 20 and 22 are separated unequal rates for interconnecting tubular members 12 and 14. As an example, cam troughs 52 and/or projection 88 could be in the form of a half of a frustoconical shape. Similarly, cam element 62 could be shaped to provide unequal rates of separation.

Likewise, although the use of two O-rings 50 passing between ends 21 and 23 in biasing connector elements 16 and 18 together is believed to be advantageous at least because of availability and ease of assembly, connector elements 16 and 18 could be biased together by other manners according to the teachings of the present invention. For example, a single O-ring 50 of an elongated length could have one end looped around shaft portion 84, then extend over jaw member 22 of connector element 18, between ends 23 of connector elements 16 and 18, over jaw members 22 and 20 of connector element 18, between ends 21 of connector elements 16 and 18, and over jaw member 20 of connector element 16, with the opposite end also being looped around shaft portion 84. Alternately, such an O-ring 50 could be extended between connector elements 16 and 18 by passing through apertures 42 formed in jaw members 20 and 22 of both connector elements 16 and 18 rather than passing around ends 21 and 23. O-ring 50 passing through apertures 42 is positioned in jaw members 20 and 22 spaced from ends 21 and 23 and is less prone to damage if ends 21 and 23 engage an object such as when accidentally dropped. Additionally, connector elements 16 and 18 could be biased by a rubber band having an elongated width generally equal to and for receipt within the spacing between legs 26 and including an aperture for passage of shaft portion 84. It should be appreciated that it may be desirable to include a sleeve or other protection for shaft portion 84 to prevent undesired engagement of O-rings 50 especially if O-rings 50 are looped around or otherwise contacts shaft portion 84. Furthermore, although O-rings 50 are believed to be advantageous, other forms of biasing can be utilized in connector 10 according to the preferred teachings of the present invention. As an example, O-rings extending around jaw members 20 and 22 generally perpendicular to the insertion direction like shown in U.S. Pat. No. 4,958,953 could be utilized to bias jaw members 20 and 22 together.

Furthermore, although shown in use with connector 10 utilizing cam 60 to separate connector elements 16 and 18, spring retainer 92 according to the preferred teachings of the present invention can be utilized with connector 10 utilizing other provisions for separating connector elements 16 and 18. Specifically, spring retainer 92 could be utilized with connectors 10 of the type shown and described in U.S. Pat. No. 5,642,957 and application. Ser. No. 08/885,358, in U.S. Pat. No. 4,958,953, as well as in arrangements including other manners of separating the jaw members and/or other shapes and configurations of jaw members.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A connector for a tubular member having annular cross sections, an inside surface, and a free end, comprising, in combination: first and second jaw members each having free ends, with the free ends of the first and second jaw members being insertable into the tubular member for an insertion distance in a longitudinal insertion direction through the free end of the tubular member while in an insertion condition, with the first and second jaw members including free edges for engaging with the inside surface of the tubular member;

and means located between the first and second jaw members for camming the first and second jaw members apart for separating the first and second jaw members to a locked condition while inserted into the tubular member for the insertion distance sufficient to allow the free edges of the jaw members to grip the inside surface of the tubular member with sufficient force to prevent relative movement between the first and second jaw members and the tubular member, with the camming means being operable from outside of the tubular member.

2. The connector of claim 1 wherein the camming means comprises a cam element rotatable about an axis, with at least one of the jaw members including a cam trough for receipt of the cam element.

3. The connector of claim 2 wherein the axis of the cam element is perpendicular to the insertion direction, with the first and second jaw members moving in a separation direction between the insertion condition and the locked condition, with the axis of the cam element being parallel to the separation direction, with the cam element comprising a projection, with the projection located in the cam trough in the insertion condition and located outside of the cam trough in the locked condition.

4. The connector of claim 3 wherein the cam element further comprises, in combination: a disc extending perpendicular to the axis of the cam element, with the projection being formed on the disc.

5. The connector of claim 4 further comprising, in combination: a third jaw member and a fourth jaw member, with the first and third jaw members being integrally connected and the second and fourth jaw members being integrally connected and separately formed from the first and third jaw members, with the third and fourth jaw members each having a free end and being insertable into another tubular member, with the third and fourth jaw members each including free edges for engaging with the inside surface of the other tubular member, with the camming means simultaneously separating the third and fourth jaw members to allow the third and fourth jaw members to grip the inside surface of the other tubular member to prevent relative movement between the third and fourth jaw members and the other tubular member and also between the tubular members.

6. The connector of claim 5 further comprising, in combination: a fifth jaw member and a sixth jaw member, with the first, third and fifth jaw members being integrally connected and the second, fourth, and sixth jaw members being integrally connected and separately formed from the first, third, and fifth jaw members, with the fifth and sixth jaw members each having a free end and being insertable into still another tubular member, with the fifth and sixth jaw members each including free edges for engaging with the inside surface of the still another tubular member, with the camming means simultaneously separating the fifth and sixth jaw members to allow the fifth and sixth jaw members to grip the inside surface of the still another tubular member to prevent relative movement between the fifth and sixth jaw members and the still another tubular member and also between the tubular members.

7. The connector of claim 6 further comprising, in combination: a seventh jaw member and an eighth jaw member, with the first, third, fifth and seventh jaw members being integrally connected and the second, fourth, sixth and eighth jaw members being integrally connected and separately formed from the first, third, fifth and seventh jaw members, with the seventh and eighth jaw members each having a free end and being insertable into a further tubular member, with the seventh and eighth jaw members each including free edges for engaging with the inside surface of the further tubular member, with the camming means simultaneously separating the seventh and eighth jaw members to allow the seventh and eighth jaw members to grip the inside surface of the further tubular member to prevent relative movement between the seventh and eighth jaw members and the further tubular member and also between the tubular members.

8. The connector of claim 6 further comprising, in combination: a collar including a top plate and a bottom plate each having an aperture and sides, with the cam element including a shaft portion of circular cross sections, with the shaft portion extending through the apertures of the top and bottom plates, with the jaw members extending through the sides of the collar.

9. The connector of claim 1 wherein the camming means comprises a cam element rotatable about an axis perpendicular to the insertion direction, with the first and second jaw members moving in a separation direction between the insertion condition and the locked condition, with the axis of the cam element being perpendicular to the separation direction, with the cam element including first and second surfaces having a spacing and third and fourth surfaces having a spacing considerably greater than the spacing of the first and second surfaces, with the third and fourth surfaces engaging the first and second jaw members in the locked position.

10. The connector of claim 9 wherein the third and fourth surfaces are flat.

11. The connector of claim 9 wherein the cam element includes a shaft portion, and wherein the connector further comprises, in combination: means for axially retaining the cam element between the first and second jaw members comprising first and second retainers removably received on the shaft portion on opposite sides of and for abutting with the first and second jaw members.

12. The connector of claim 11 wherein the first and second jaw members each include a cam aperture, and wherein the connector further comprises, in combination: means for axially retaining the cam element between the first and second jaw members comprising a retainer integral with the cam element, with the retainer being received and rotatable within the cam apertures of the first and second jaw members.

13. The connector of claim 9 further comprising, in combination: a collar including first and second side plates extending parallel to the separation direction, with the first and second side plates each including a shaft aperture, with the cam element including a shaft portion of circular cross sections and extending through the shaft apertures of the first and second sides.

14. The connector of claim 9 further comprising, in combination: a third jaw member and a fourth jaw member, with the first and third jaw members being integrally connected and the second and fourth jaw members being integrally connected and separately formed from the first and third jaw members, with the third and fourth jaw members each having a free end and being insertable into another tubular member, with the third and fourth jaw members each including free edges for engaging with the inside surface of the other tubular member, with the camming means simultaneously separating the third and fourth jaw members to allow the third and fourth jaw members to grip the inside surface of the other tubular member to prevent relative movement between the third and fourth jaw members and the other tubular member and also between the tubular members.

15. The connector of claim 1 wherein the spacing between the free edges of the first and second jaw members increase from the free ends for the insertion distance; and wherein the free edges of each of the jaw members is arcuate from the free end for the insertion distance.

16. The connector of claim 15 wherein the free edges are cut to define teeth to enhance non-slip engagement with the tubular member.

17. The connector of claim 1 wherein the first and second jaw members each have generally U-shaped cross sections perpendicular to the longitudinal insertion direction and each includes a central portion and first and second legs upstanding from the opposite sides of the central portion, with the central portions of the first and second jaw members being in a parallel relation and with the legs of the first jaw member extending in the opposite direction than the legs of the second jaw member, with the legs having the free edges, with the first and second legs extending outwardly from the central portion at an obtuse angle.

18. A holding device for a connector for a tubular member having annular cross sections of a size, an inside surface, and a free end, with the connector including first and second jaw members each having free ends, with the free ends of the first and second jaw members being insertable into the tubular member in a longitudinal insertion direction through the free end of the tubular member while in an insertion condition, with the first and second jaw members in a locked condition gripping the inside surface of the tubular member with sufficient force to prevent relative movement between the first and second jaw members and the tubular member, comprising, in combination: a spring retainer including first and second leg portions, with the first and second leg portions having free edges in an unflexed condition being spaced greater than the size of the tubular member; and means for holding the spring retainer in position relative to the first and second jaw members while allowing the first and second leg portions to flex and allowing the leg portions to cam upon the free end of the tubular member to flex the leg portions to be spaced for slideable receipt in the tubular member while the first and second jaw members are being inserted into the tubular member and allowing the leg portions to flex outwardly and grip the inside surface of the tubular member if the first and second jaw members are attempted to move opposite the longitudinal insertion direction.

19. The holding device of claim 18 wherein the spring retainer further includes a central portion, with the first and second leg portions upstanding from the central portion at an obtuse angle, with the central portion having a dimension between the first and second leg portions which is less than the size of the tubular member.

20. The holding device of claim 18 wherein the holding means comprises means for removably holding the spring retainer in position, with the first and second jaw members each including an opening adjacent the free ends, with the first and second leg portions each including an aperture adjacent to the free edge, and with the removably holding means comprising a pin extending through the openings of the first and second jaw members and through the apertures of the first and second leg portions.

21. The holding device of claim 18 wherein the free edges of the first and second leg portions include right angle, sharp corners.

22. The holding device of claim 18 wherein the spacing between the free edges of the first and second jaw members is reduced from the free ends in the insertion direction corresponding to the first and second leg portions than the spacing between the free edges of the first and second jaw member at other portions beyond the first and second leg portions in the insertion direction.

23. A connector for a tubular member having annular cross sections of a size, an inside surface, and a free end, comprising, in combination: first and second jaw members each having free ends, with the free ends of the first and second jaw members being insertable into the tubular member for an insertion distance in a longitudinal insertion direction through the free end of the tubular member while in an insertion condition, with the first and second jaw members including free edges for engaging with the inside surface of the tubular member; means located between the first and second jaw members for camming the first and second jaw members apart for separating the first and second jaw members to a locked condition while inserted into the tubular member for the insertion distance sufficient to allow the free edges of the jaw members to grip the inside surface of the tubular member with sufficient force to prevent relative movement between the first and second jaw members and the tubular member, with the camming means being operable from outside of the tubular member; a spring retainer including first and second leg portions, with the first and second leg portions having free edges in an unflexed condition being spaced greater than the size of the tubular member; and means for holding the spring retainer in position relative to the first and second jaw members while allowing the first and second leg portions to flex and allowing the leg portions to cam upon the free end of the tubular member to flex the leg portions to be spaced for slideable receipt in the tubular member while the first and second jaw members are being inserted into the tubular member and allowing the leg portions to flex outwardly and grip the inside surface of the tubular member if the first and second jaw members are attempted to move opposite the longitudinal insertion direction.

\* \* \* \* \*